(12) United States Patent
Lachance

(10) Patent No.: US 8,757,654 B2
(45) Date of Patent: Jun. 24, 2014

(54) ANTI-THEFT DEVICE FOR USE WITH A TRAILER HITCH

(71) Applicant: Ephrem Lachance, Saint-Damase (CA)

(72) Inventor: Ephrem Lachance, Saint-Damase (CA)

(73) Assignee: Cojega Inc., St. Damase, Quebec (CA)

( * ) Notice: Subject to any disclaimer, the term of this patent is extended or adjusted under 35 U.S.C. 154(b) by 0 days.

(21) Appl. No.: 14/039,541

(22) Filed: Sep. 27, 2013

(65) Prior Publication Data

US 2014/0028000 A1 Jan. 30, 2014

Related U.S. Application Data

(63) Continuation of application No. PCT/CA2012/050806, filed on Nov. 14, 2012.

(60) Provisional application No. 61/559,322, filed on Nov. 14, 2011.

(51) Int. Cl.
*B60D 1/60* (2006.01)

(52) U.S. Cl.
CPC .......................................... *B60D 1/60* (2013.01)
USPC ............................ 280/507; 280/511; 280/512

(58) Field of Classification Search
CPC .............. B60D 1/60; B60D 1/06; B60D 1/28; B60D 1/58
USPC .......................................... 280/507, 511, 512
See application file for complete search history.

(56) References Cited

U.S. PATENT DOCUMENTS

| | | |
|---|---|---|
| 3,237,969 A | 3/1966 | Geresy |
| 3,410,580 A | 11/1968 | Longenecker |
| 3,434,741 A | 3/1969 | Grant, Jr. |
| 3,526,110 A | 9/1970 | Foote |
| 3,770,298 A | 11/1973 | Phillips |
| 3,780,546 A | 12/1973 | Longenecker |
| 4,291,557 A | 9/1981 | Bulle et al. |
| 4,428,596 A | 1/1984 | Bell et al. |
| 4,581,908 A | 4/1986 | Bulle et al. |

(Continued)

FOREIGN PATENT DOCUMENTS

| | | |
|---|---|---|
| CA | 143088 | 7/2012 |
| GB | 2255538 | 11/1992 |
| GB | 2285833 | 7/1995 |
| WO | 2013071431 | 5/2013 |

OTHER PUBLICATIONS

Written opinion for PCT/CA2012/050806 mailed on Feb. 6, 2013 by the Canadian Intellectual Property Office.

*Primary Examiner* — Kevin Hurley
*Assistant Examiner* — Michael Stabley
(74) *Attorney, Agent, or Firm* — IPAXIO S.E.N.C.

(57) ABSTRACT

The anti-theft device is for use with a trailer hitch regardless of whether the trailer hitch is attached or unattached to a towing vehicle ball. The device is selectively movable between an open position and a closed position. It includes two complementary and substantially coplanar base plates, two mutually-facing rim members defining an inner slotted space receiving the lateral flanged edge of the trailer hitch when the device is in the closed position on the trailer hitch, and two anchoring members. Each anchoring member is rigidly connected to and downwardly projecting from the corresponding plate. The device is very compact, effective, easy to use, and can be installed or removed in a few seconds. It provides a very convenient way of preventing the theft of a trailer.

20 Claims, 11 Drawing Sheets

(56) References Cited

U.S. PATENT DOCUMENTS

| | | | |
|---|---|---|---|
| 5,063,759 | A | 11/1991 | Nee et al. |
| 5,195,339 | A | 3/1993 | Nee et al. |
| D350,054 | S | 8/1994 | Richter |
| 5,433,467 | A | 7/1995 | Easterwood |
| 5,575,494 | A | 11/1996 | DeVries |
| 5,681,053 | A | 10/1997 | Misukanis et al. |
| 5,752,398 | A | 5/1998 | Villalon, Jr. |
| 5,937,679 | A | 8/1999 | Villalon, Jr. |
| 5,961,140 | A | 10/1999 | Huskey |
| 6,244,614 | B1 | 6/2001 | Bonvillain et al. |
| 6,530,249 | B1 | 3/2003 | Burkhead |
| 6,880,368 | B1 | 4/2005 | Ulbrich et al. |
| 6,938,912 | B1 * | 9/2005 | Norton et al. ............ 280/507 |
| 6,945,552 | B2 | 9/2005 | Stone |
| 6,948,733 | B2 | 9/2005 | Webster et al. |
| 7,246,810 | B2 | 7/2007 | Bussiere et al. |
| D563,838 | S | 3/2008 | McCowan |
| 7,469,919 | B2 | 12/2008 | Kalous et al. |
| 7,543,838 | B2 | 6/2009 | Jacques |
| 7,635,143 | B2 | 12/2009 | Pappalardo |
| 7,699,336 | B2 | 4/2010 | Van Laere |
| D659,599 | S | 5/2012 | Story |
| D688,170 | S | 8/2013 | Woolever |
| D688,171 | S | 8/2013 | Cirino |
| 2010/0320730 | A1 | 12/2010 | Ferland |

\* cited by examiner

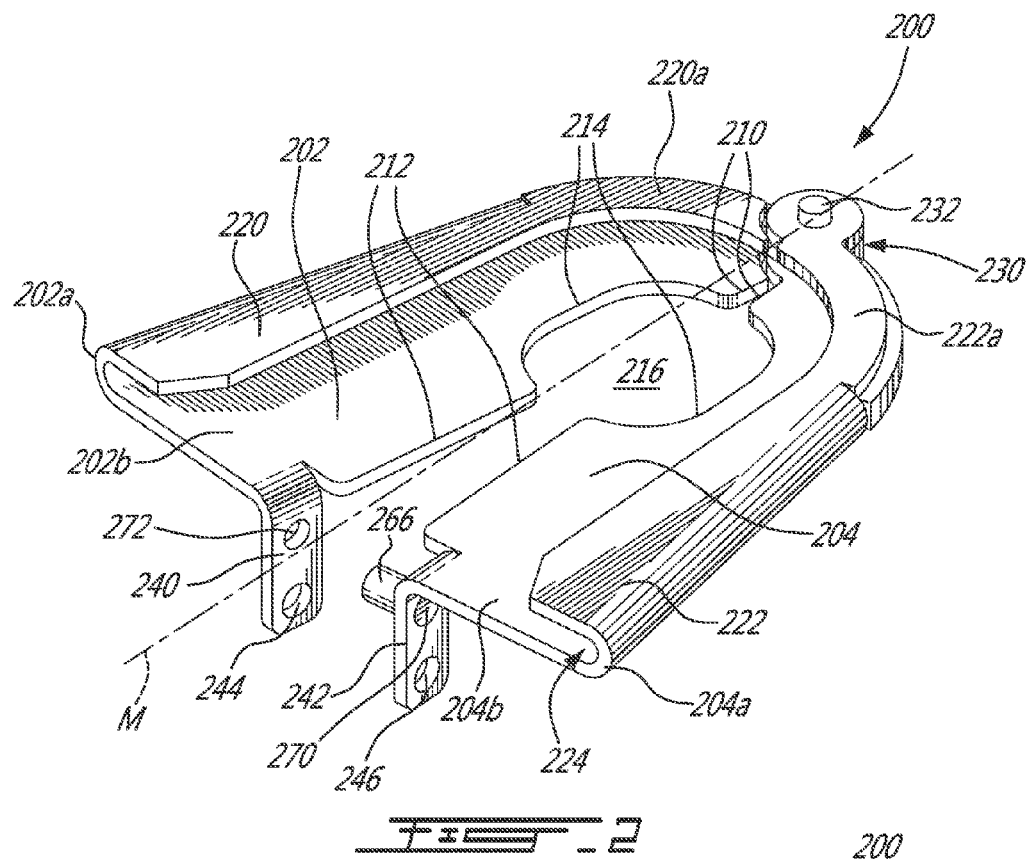
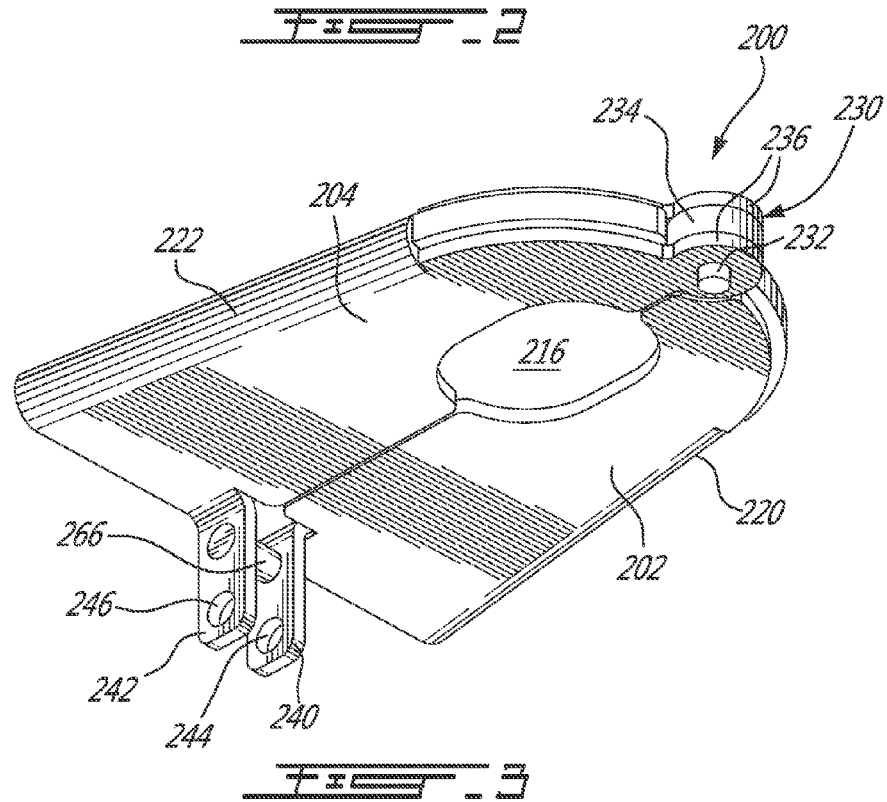

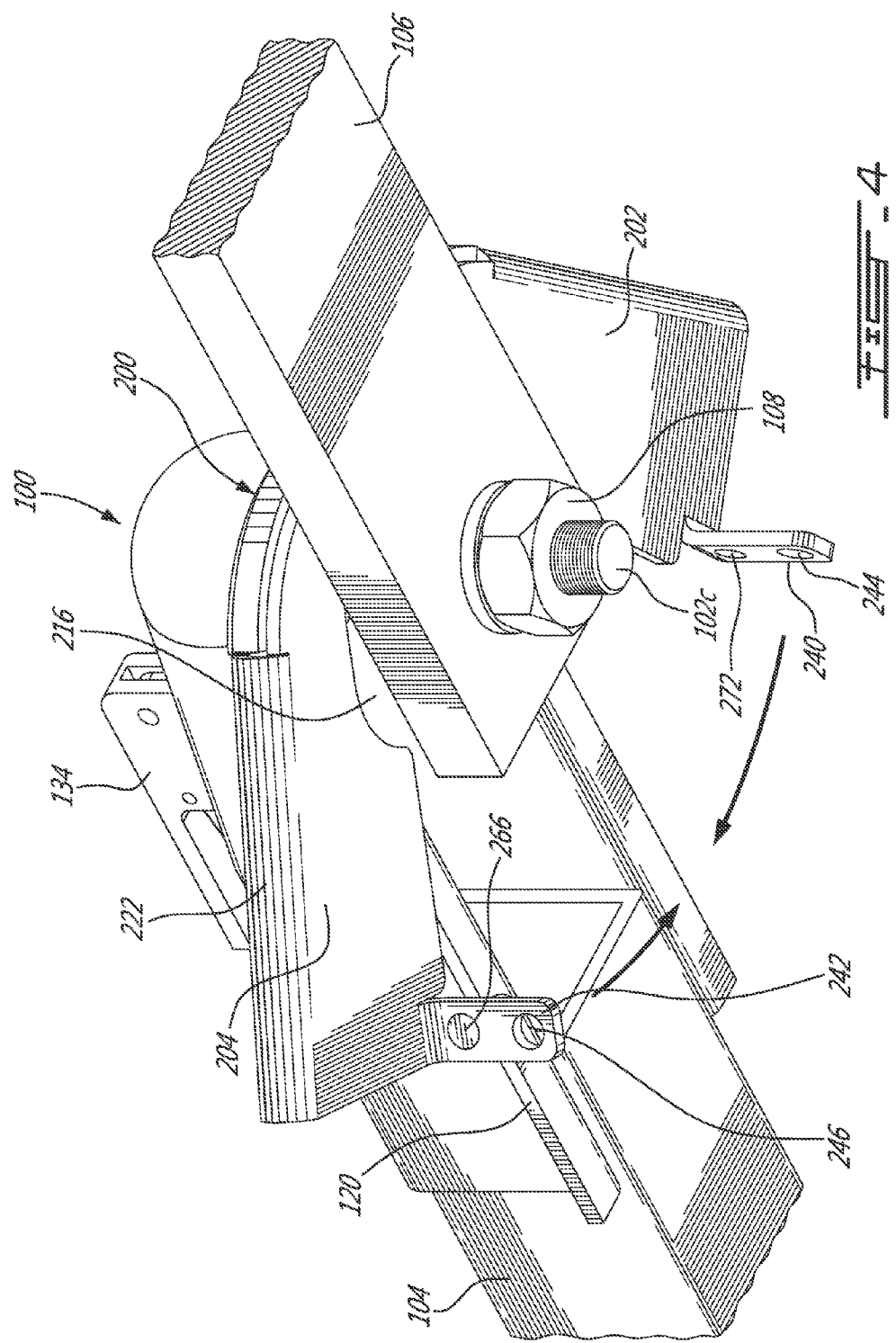

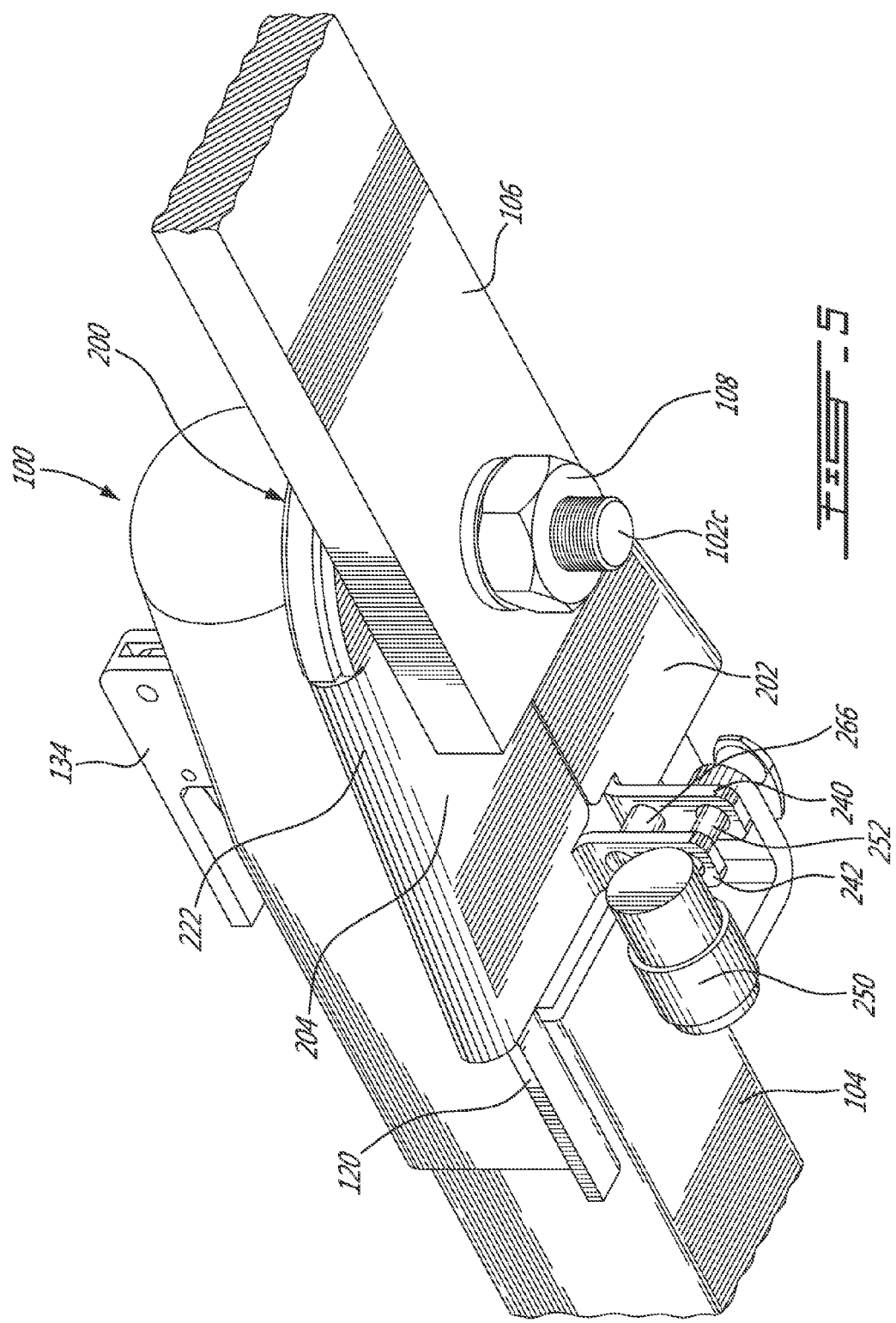

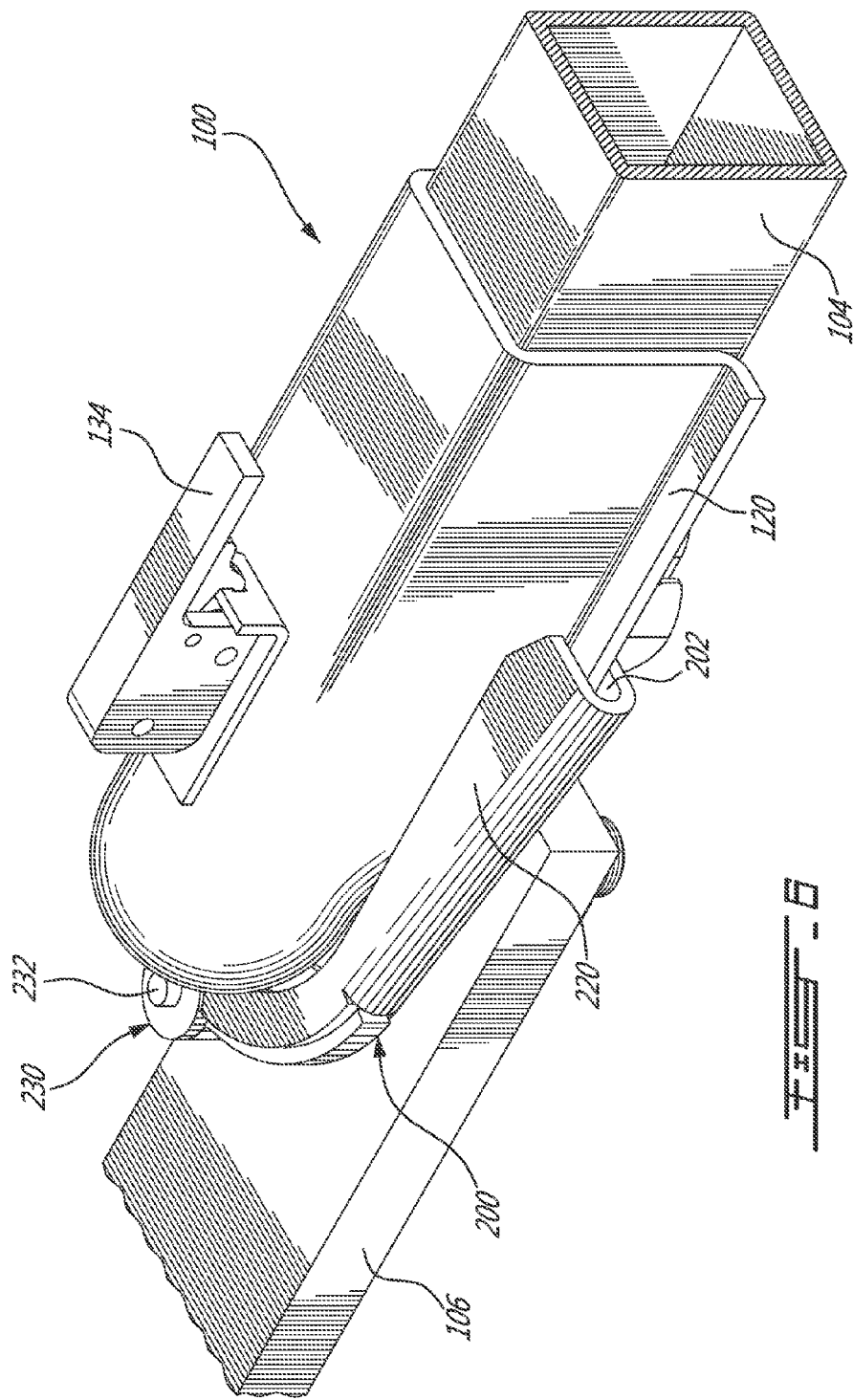

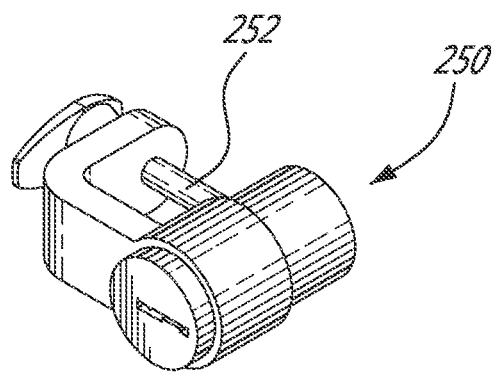
_Fig. 7_

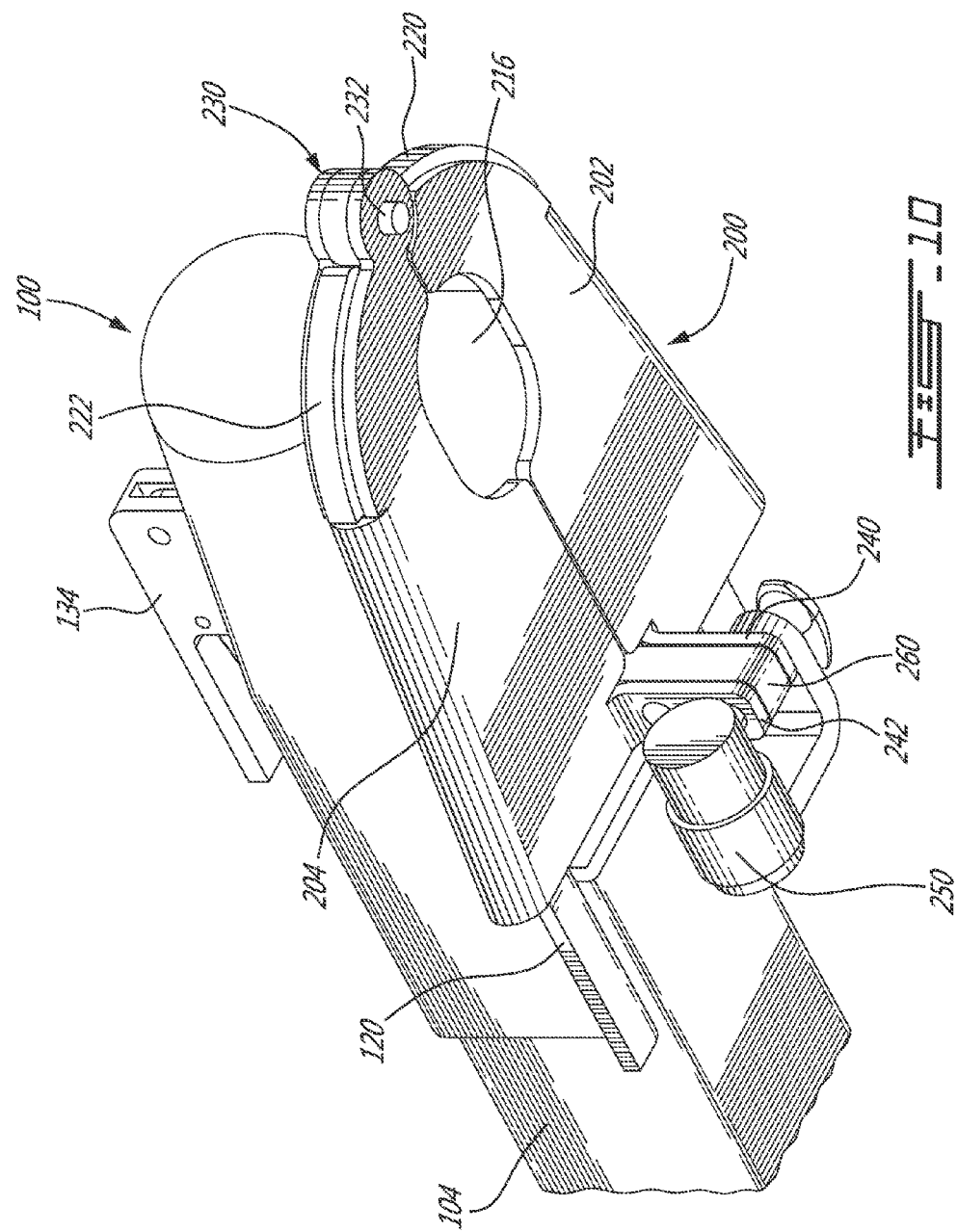

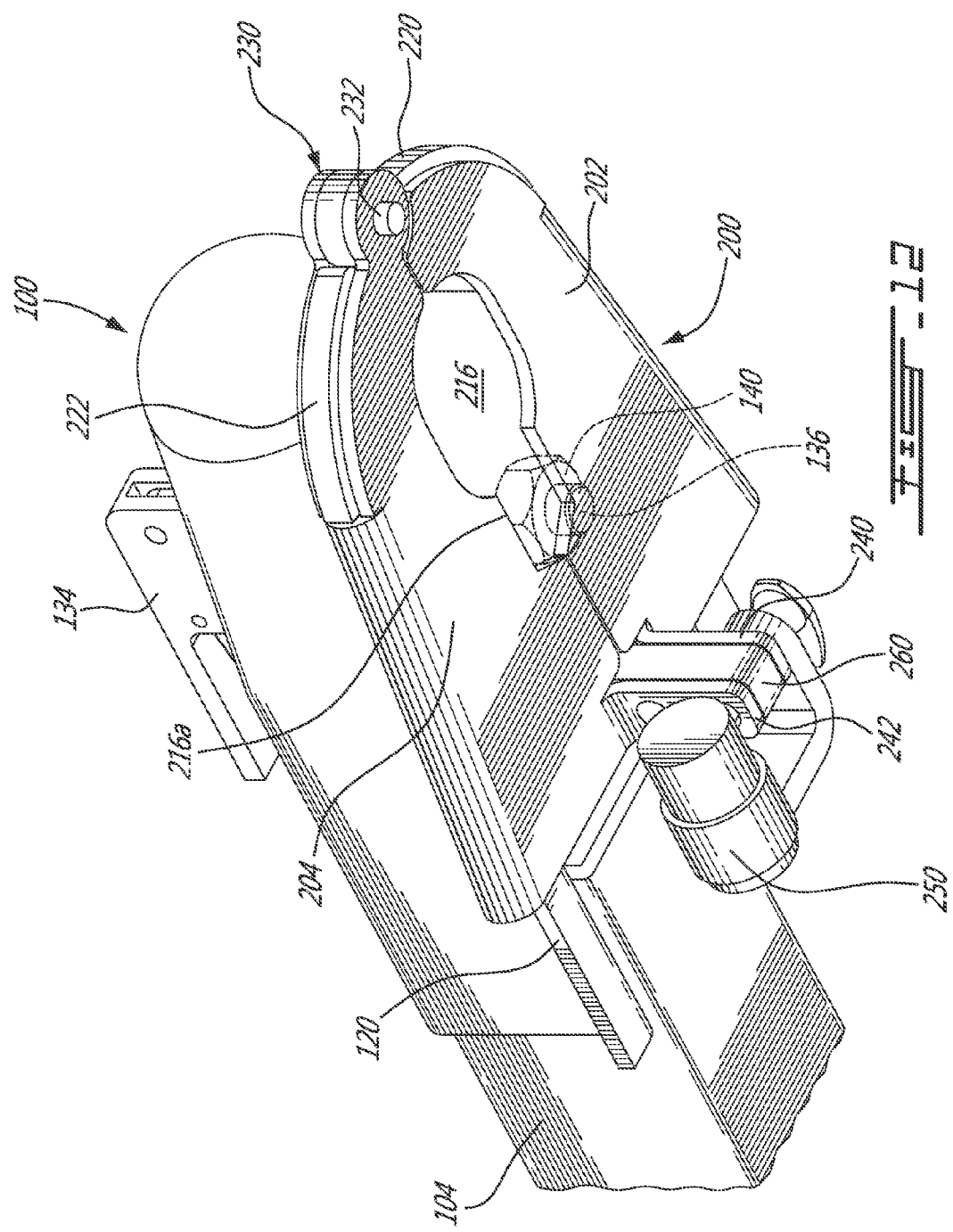

ANTI-THEFT DEVICE FOR USE WITH A TRAILER HITCH

CROSS-REFERENCE TO PRIOR APPLICATIONS

This application is a continuation of PCT Application No. PCT/CA2012/050806 filed on 14 Nov. 2012. PCT/CA2012/050806 claims priority to U.S. Patent Application No. 61/559,322 filed on 14 Nov. 2011. The entire contents of these two prior applications are incorporated herein by reference in their entirety.

TECHNICAL FIELD

The technical field relates generally to anti-theft devices for use with trailer hitches.

BACKGROUND

Numerous devices have been suggested over the years to prevent unauthorized uses of trailers. Some devices are designed to prevent someone from inserting a vehicle tow ball inside the ball socket of the trailer hitch of an unattended trailer. Examples are disclosed in U.S. Pat. No. 3,434,741 (Grant) of 1969, U.S. Pat. No. 3,526,110 (Foote) of 1970, U.S. Pat. No. 4,291,557 (Bulle et al.) of 1981 and U.S. Pat. No. 4,581,908 (Bulle et al.) of 1986, to name just a few.

Other devices are designed to prevent the trailer hitch from being detached from the trailer tow bar, thereby preventing someone from using another trailer hitch and towing the trailer away. See for instance U.S. Pat. No. 7,635,143 (Pappalardo) of 2009.

Still, some devices are designed to prevent someone from detaching the trailer hitch from a vehicle tow ball to which it is attached. See for instance U.S. Pat. No. 3,770,298 (Phillips) of 1973.

Existing devices suffer from one or more deficiencies, particularly in terms of simplicity, ease of use and versatility. Accordingly, there is still room for improvements in this area of technology.

SUMMARY

In one aspect, there is provided an anti-theft device for use with a trailer hitch regardless of whether the trailer hitch is attached or unattached to a towing vehicle ball, the ball having a shank portion and a spherical upper portion located over the shank portion, the spherical upper portion being larger in width than the shank portion, the trailer hitch having a bottom lateral flanged edge, a bottom-opened ball socket and a ball locking mechanism, the device being selectively movable between an open position and a closed position, the device including: two complementary and substantially coplanar base plates, each base plate including: a front inner edge, the front inner edges of the two base plates being in engagement with one another when the device is in the closed position and being out of engagement with one another when the device is in the open position; a rear inner edge, the rear inner edges of the two base plates being in engagement with one another when the device is in the closed position and being out of engagement with one another when the device is in the open position; and an intermediate inner edge located between the corresponding front and rear inner edges, the intermediate inner edges of the two base plates being spaced apart from one another and forming an intervening opening when the device is in the closed position, the opening being smaller in width than the spherical upper portion of the ball and larger in width than the shank portion of the ball; two mutually-facing rim members, one for each base plate, each rim member being rigidly connected to and projecting above an outer side edge of the corresponding base plate, the rim members defining an inner slotted space receiving corresponding right and left portions of the lateral flanged edge when the device is in the closed position on the trailer hitch, the rim members having mating front ends that are pivotally connected together by a front hinge; and two anchoring members, one for each base plate, each anchoring member being rigidly connected to and downwardly projecting at a rear end of the corresponding base plate.

In another aspect, there is provided an anti-theft method for a trailer having a trailer hitch, the method including: (A) moving a two-sided anti-theft device from an open position to a closed position on the trailer hitch, the device including two mutually-facing rim members defining an inner slotted space receiving corresponding portions of a lateral flanged edge of the trailer hitch, the rim members having mating front ends that are pivotally connected together at a front hinge; (B) locking the two sides of the device together in the closed position on the trailer hitch using a locking device to prevent the device from being removed from the trailer hitch; (C) simultaneously blocking an unauthorized insertion of a ball into an empty bottom-opened ball socket of the trailer hitch and blocking an unauthorized removal of the ball out of the socket, if the ball was already present in the socket before step (A), using a pair of juxtaposed plates provided on the device and located under the trailer hitch when the device is in the closed position, the plates defining an opening and each of the rim members being rigidly connected to a corresponding one of the plates; and (D) if the ball was already present in the socket before step (A), towing the trailer using a vehicle to which the ball is connected, the trailer being towed with the device still being in the closed position and locked on the trailer hitch.

Further details on these aspects as well as other aspects of the proposed concept will be apparent from the following detailed description and the appended figures.

BRIEF DESCRIPTION OF THE FIGURES

FIG. 2 is an isometric view of an example of an anti-theft device as suggested herein, the device being shown in a partially open position;

FIG. 3 is an isometric view illustrating the device of FIG. 2 from another angle and in the closed position;

FIG. 4 is an isometric view illustrating the device of FIG. 2 in a fully open position and being installed on the trailer hitch shown in FIG. 1;

FIG. 5 is a view similar to FIG. 6, showing the device once set in the closed position on the trailer hitch and being locked using an example of a padlock;

FIG. 6 is a view similar to FIG. 5 but from a different angle;

FIG. 7 is an enlarged isometric view of the generic padlock shown in FIG. 5;

FIG. 9 is an isometric view illustrating an example of a removable locking member for use with the device of FIG. 2 when installed on a trailer hitch that is unattached to a towing vehicle ball;

FIG. 10 is a bottom isometric view illustrating the device of FIG. 2 installed and locked on a trailer hitch that is unattached to the towing vehicle ball;

FIG. 12 is a view similar to FIG. 10, showing another example of an anti-theft device as suggested herein.

DETAILED DESCRIPTION

Figure 1:
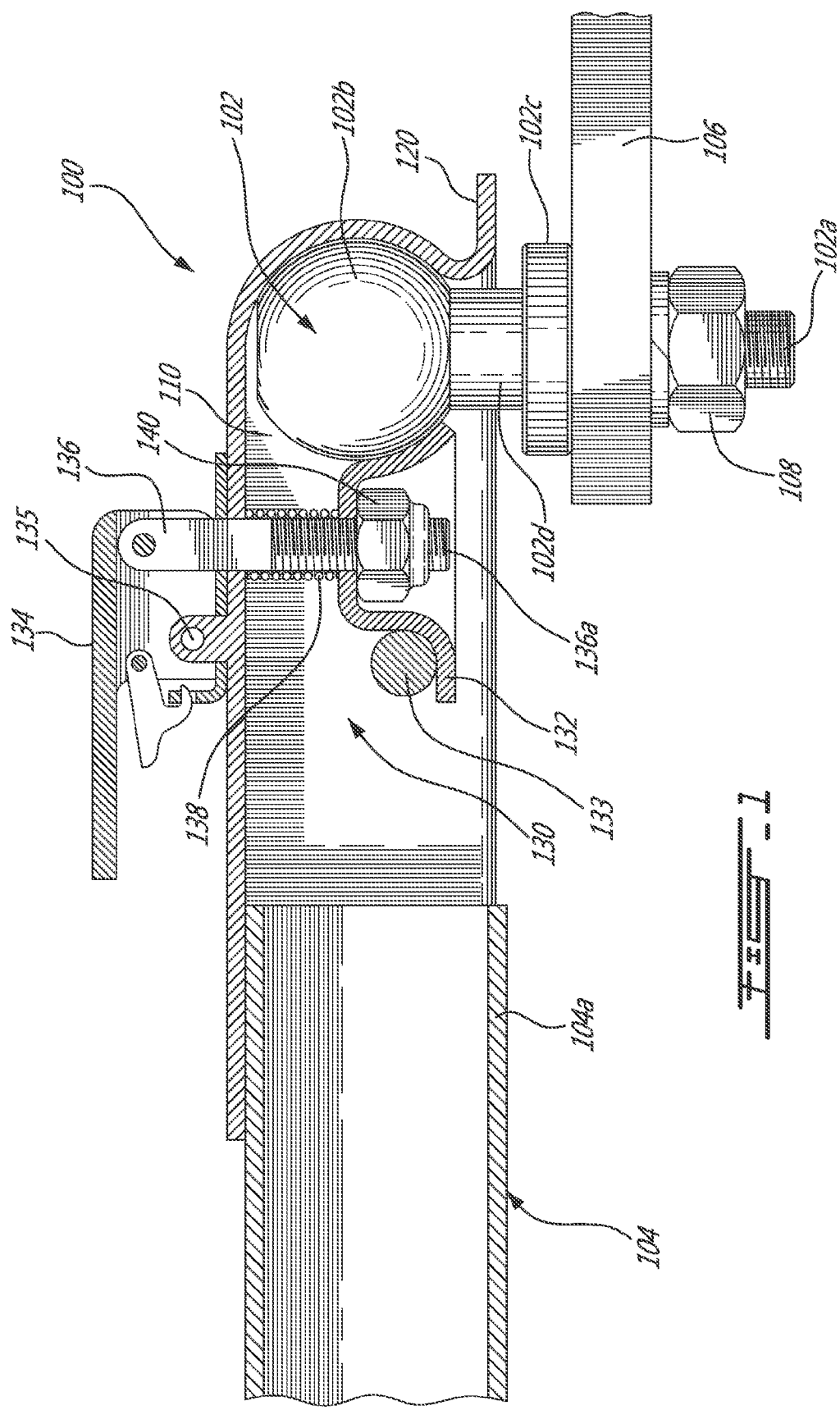
FIG. 1 is a longitudinal cross-sectional view of an example of a generic trailer hitch attached to a generic towing vehicle ball prior to the installation of an anti-theft device.

FIG. 1 is a longitudinal cross-sectional view of an example of a generic trailer hitch 100 attached to an example of a generic towing vehicle ball 102 prior to the installation of an anti-theft device. The models and configurations of the trailer hitch 100 and of the towing vehicle ball 102 can vary, depending on the implementation. The trailer hitch 100 is bolted, welded or otherwise attached at the front end 104a of a trailer tow bar 104 extending in front of the trailer to be towed by the vehicle.

The ball 102 is bolted or otherwise attached to a removable or fixed element of the vehicle, for instance a draw bar or a bumper of the vehicle. The ball 102 is provided at the rear of the vehicle in most cases, although exceptions exist. In the example illustrated in FIG. 1, the ball 102 is bolted to a draw bar 106 using a nut 108 mounted on a threaded bottom stem portion 102a of the ball 102. The ball 102 thus has a portion that extends downwards through a hole provided across the thickness of the draw bar 106. The nut 108 is generally mounted with a very high tightening torque and mechanical glue can also be provided over the threads of the nut 108 to hold it even more. The high tightening torque and the mechanical glue can also mitigate the risks of having a thief being able to remove the nut 108 using a handheld tool. Variants are also possible. For instance, the ball 102 can be welded to the draw bar 106. Many other variants are possible as well.

The illustrated generic ball 102 includes a spherical upper portion 102b that can be inserted inside a bottom-opened ball socket 110 of the trailer hitch 100. The socket 110 is generally located at the front end of the trailer hitch 100. The spherical upper portion 102b is located inside the socket 110 when the trailer hitch 100 is attached thereto. The spherical upper portion 102b is provided above a base portion 102c resting on the upper surface of the draw bar 106 to which the stem portion 102a is attached. The spherical upper portion 102b and the base portion 102c are spaced-apart from one another and connected through a shank portion 102d. The shank portion 102d of the illustrated example has a circular cross section. Variants are possible. The diameter of the spherical upper portion 102b is made larger than that of the shank portion 102d over which the spherical upper portion 102b is connected.

The trailer hitch 100 includes an outwardly-projecting bottom lateral flanged edge 120. Although only the front portion of the lateral flanged edge 120 is visible in FIG. 1, the lateral flanged edge 120 also extends around the right and the left side of the trailer hitch 100, as shown for instance in FIGS. 4 to 6. The lateral flanged edge 120 is generally continuous and has a curved front portion matching the curved outer shape of the trailer hitch 100. Variants are also possible.

The trailer hitch 100 further includes a ball locking mechanism 130. The ball locking mechanism 130 includes a locking element 132 having a portion that is selectively engageable with the ball 102, more particularly the bottom half of the spherical upper portion 102b, when the ball 102 is present in the socket 110. The ball locking mechanism 130 is designed to selectively activate or release the engagement of the locking element 132 with the ball 102. The exact construction of the ball locking mechanism 130 can vary from one implementation to another.

In the example illustrated in FIG. 1, one side of the locking element 132 engages the bottom-half on the side of the spherical upper portion 102b when the ball locking mechanism 130 is activated. The opposite side of the locking element 132 then engages the bottom side of a transversal pin 133 or a similar fixed structure that can be used as a resting point. The locking element 132 is connected to a vertically-extending rod 136 using a downwardly-facing nut 140 attached to a bottom threaded section of the rod 136. The locking element 132 of the illustrated example is substantially circular in shape and also has a substantially inverted cup shape. Variants are possible. For instance, the locking element 132 can be substantially flat in some implementations. Many other variants are possible as well.

The illustrated ball locking mechanism 130 includes a lever 134 that is pivotally mounted on the top portion of the trailer hitch 100. Changing the position of the lever 134 moves the rod 136 at the bottom end of which is connected the locking element 132. The rod 136 is urged downwards by a helical compression spring 138 coaxially mounted around the rod 136 between the interior of the socket 110 and the locking element 132. Moving the rod 136 downwards from its position shown in FIG. 1 will loosen the connection between the locking element 132 and the ball 102, thereby allowing the ball 102 to be moved out of the socket 110. Variants are possible as well.

The lever 134 of the ball locking mechanism 130 can be locked when it is in a horizontal position using a padlock or a similar arrangement (not shown), for instance a padlock having a shackle inserted through a transversal passageway 135, so as to prevent an unauthorized person from releasing the ball locking mechanism 130 by simply lifting the lever 134. Variants are also possible.

FIG. 2 is an isometric view of an example of an anti-theft device 200 as suggested herein. The device 200 is shown in a partially open position. The same device 200 is also illustrated in FIG. 3 from another angle and in the closed position.

The device 200 is made of a durable and resistant material, for instance a metallic material such as steel, stainless steel, etc. Non-metallic materials are also possible, depending on the implementation and the desired level of strongness.

The device 200 is designed to be mounted on the lateral flanged edge 120 of the trailer hitch 100 regardless of whether the trailer hitch 100 is attached or unattached to the ball 102. However, once locked using for instance a padlock or the like, the device 200 will remain on the trailer hitch 100 and if the trailer hitch 100 was already attached to the ball 102 before the device 200 was set in the closed position, the trailer can still be towed by the vehicle without the need of removing the device 200. If the trailer hitch 100 was not attached to the ball 102 before the device 200 was set in the closed position, the design of the device 200 will prevent the ball 102 from being inserted therein. Thus, the same device 200 can be locked so as to prevent unauthorized removal of the trailer hitch 100 from the ball 102 of a towing vehicle or an unauthorized insertion of the trailer hitch 100 over the ball 102 of a towing vehicle.

It should be noted at this point that the word "attached" in the present context means that the ball 102 is set inside the trailer hitch 100 regardless of whether the ball locking mechanism 130 is activated or not. The word "unattached" in the present context means that the ball 102 is not present in the trailer hitch 100.

The device 200 includes two complementary and substantially coplanar base plates 202, 204. In the illustrated example, the plates 202, 204 are flat and are substantially symmetric with reference to the medial axis M. Variants are also possible. For the sake of clarity, reference will now only be made to a substantially symmetric device 200 in the detailed description. The illustrated device 200 has a right side and a left side that are substantially mirror images of one another.

Each plate 202, 204 of the device 200 includes a front inner edge 210, a rear inner edge 212 and an intermediate inner edge 214. The intermediate inner edges 214 are located between the corresponding front and rear inner edges 210, 212. Both front inner edges 210 are in engagement with one another when the device 200 is set in the closed position and are out of engagement with one another when the device 200 is set in the open position. Likewise, both rear inner edges 212 are in engagement with one another when the device 200 is set in the closed position and are out of engagement with one another when the device 200 is set in the open position. It should be noted that although the corresponding engagements of the front and rear inner edges 210, 212 are made along a straight line coincident with the medial axis M in the illustrated example, one can still obtain engagements between the front and rear inner edges 210, 212 can be in engagement with one another using a different configuration or arrangement that is not linear. Other variants are also possible.

Both intermediate inner edges 214 are spaced apart from one another and form together an intervening opening 216 when the device 200 is set in the closed position. This opening 216, when the ball 102 is present in the socket 110, will loosely surround the shank portion 102d of the ball 102 but will be smaller than the spherical upper portion 102b thereof. Thus, once the device 200 is installed and locked, the trailer hitch 100 cannot be removed from the ball 102 but the device 200 will not interfere with the movement of the trailer hitch 100. In use, the vertical and horizontal alignment of the trailer tow bar 104 will change as the vehicle turns right or left and also when it moves on uneven road surfaces. For instance, when the vehicle goes down a sidewalk and into a street, the wheels of the trailer will be higher than the wheels of the vehicle at some point and the shank portion 102d of the ball 102 will need some clearance within the opening 216 to prevent it from touching the intermediate inner edges 214. In the illustrated example illustrated, the opening 216 is generally oblong and is elongated along the medial axis M. It can also have other shapes. For instance, it includes an enlarged wedge-shaped rear portion. Other shapes and configurations are possible as well.

The device 200 also includes two mutually-facing rim members 220, 222, one for each plate 202, 204. Each rim member 220, 222 is rigidly connected to and projecting above an outer side edge 202a, 204a of the corresponding plate 202, 204. In the illustrated example, they form a monolithic piece with the corresponding left and right plate 202, 204. For instance, the rim members 220, 222 can be a bended extension of the corresponding plates 202, 204 and/or be welded or otherwise permanently connected together. Variants are possible as well.

Each rim member 220, 222 defines an inner slotted space 224 configured and disposed to receive a corresponding right or left portion of the lateral flanged edge 120 of the trailer hitch 100 when the device 200 is in the closed position thereon. The inner slotted space 224 extends uninterruptedly from one end of the device 200 to the other. Other configurations and arrangements are also possible.

The rim members 220, 222 include mating front ends 220a, 222a that are pivotally and directly connected together using a front hinge 230. Variants are possible as well. In the illustrated example, as best shown in FIG. 3, the front hinge 230 includes a substantially vertically-oriented axle 232 to which the front ends 220a, 222a of the rim members 220, 222 are pivotally connected. The rim members 220, 222 overlap one another and the axle 232 is welded or otherwise arranged to prevent someone from removing it using only hand tools. This way, the right side and the left side of the device 200 are pivotally connected together and the connection between them is made very difficult to overcome. The illustrated hinge 230 includes a flat portion 234 at the front end 220a of the left rim member 220 that is inserted in-between two spaced-apart flat portions 236 at the front end 222a of the right rim member 222. Other configurations and arrangements are also possible. In the illustrated example, the flat portions 234, 236 are permanently connected together using the axle 232. Variants are possible. For instance, the hinge 230 could include two tabs (not shown) cooperating with one another when the device 200 is closed. This can make the right and left sides of the device 200 detachable from one another. Other variants are possible as well.

Two anchoring members 240, 242, one for each plate 202, 204, are also provided in the device 200. Each anchoring member 240, 242 is rigidly connected to and downwardly projecting from the corresponding plate 202, 204. In the illustrated example, the anchoring members 240, 242 are facing one another in the closed position and are bended parts made integral with the corresponding plate 202, 204. They include at least one pair of transversal holes 244, 246. These holes 244, 246 are in registry with one another when the device 200 is in a closed position. Variants are possible as well.

FIG. 4 is an isometric view illustrating the device 200 being installed on the trailer hitch 100 shown in FIG. 1. FIG. 4 shows the front of the device 200 being positioned over the lateral flanged edge 120 of the trailer hitch 100 but before the device 200 is set to its closed position.

FIG. 5 is a view similar to FIG. 6 and it shows the device 200 once set in the closed position on the trailer hitch 100. The device 200 is locked using a locking system, such as a padlock 250, once in the closed position on the trailer hitch 100. The generic padlock 250 illustrated as an example includes a rod 252 (FIG. 7) that is inserted through the holes 244, 246 of the anchoring members 240, 242. Variants are also possible. For instance, other padlock models are possible. Using an integrated lock or another kind of locking system is another possibility. Many other variants are possible as well. In the present context, a locking system means a system capable of preventing an unauthorized person from removing the locked device 200 from its closed position. The locking system is operated using a key, a dial or any equivalent thereof.

FIG. 6 is a view similar to FIG. 5 but from a different angle.

FIG. 7 is an isometric view illustrating the generic padlock 250 shown in FIG. 5. This padlock 250 is operated by a key. As aforesaid, other models and configurations are possible as well.

Figure 8:
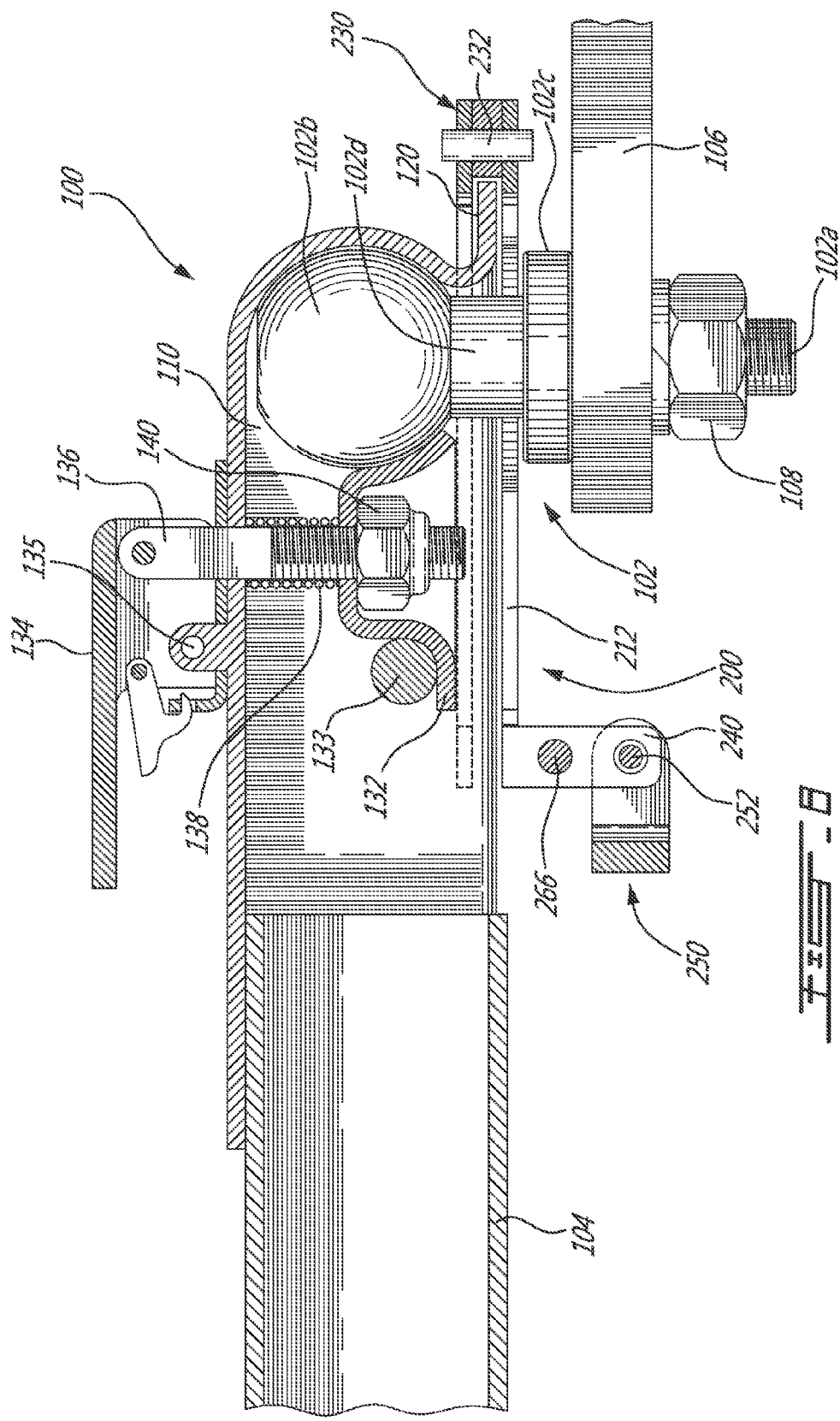
FIG. 8 is a view similar to FIG. 1 but with the device of FIG. 2 being in the closed position and locked on the trailer hitch.
Figure 8:
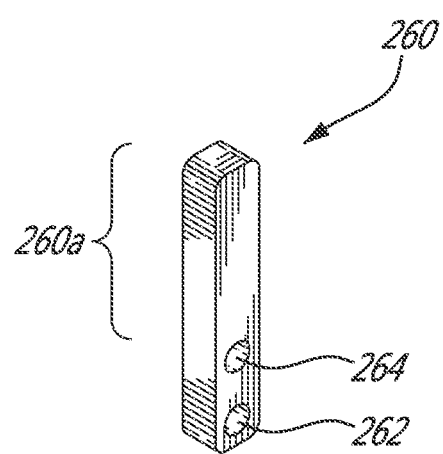

FIG. 8 is a view similar to FIG. 1 but with the device 200 in the closed position and locked on the trailer hitch 100. As can be appreciated, because the spherical upper portion 102b of the ball 102 is larger in width than the opening 216 (FIG. 3), the trailer hitch 100 cannot break away from the ball 102 even if the lever 134 is accidentally released, thereby further increasing safety. Still, the rear edges 212 of the plates 202, 204 extend right under a region where the locking element 132 of the ball locking mechanism 130 is located. This prevents access to the nut 140 when the device 200 is locked on the trailer hitch 100, thereby preventing someone from unscrewing the nut 140 from below the trailer hitch 100 in a futile attempt to steal the trailer or for other unlawful purpose.

FIG. 9 is an isometric view illustrating an example of a removable locking member 260 for use when the device 200 is mounted on the trailer hitch 100 that is unattached to a towing vehicle ball. This may be the situation of someone leaving the trailer unattended in a parking when it is not needed. Unlike the case where the trailer hitch 100 is attached to a ball 102, the device 200 can otherwise slide if it is not stopped. With the ball 102 (FIG. 8), the device 200 is stopped by the ball 102 itself. The removable locking member 260 of the illustrated example is generally rectangular in shape but other shapes are also possible. It is configured and disposed to be inserted into the space provided between the two anchoring members 240, 242. It also includes a first transversal hole 262 designed to be in registry with the holes 244, 246 of the anchoring members 240, 242 to receive the rod 252 of the padlock 250. The locking member 260 includes an extended portion 260a that can be set so as to project upwardly inside the trailer hitch 100 and to abut against the rear side of the locking element 132 or of the transversal pin 133. This will prevent the device 200 from being pulled out from the trailer hitch 100 by sliding the device 200 forward, this without the necessity of connecting the padlock 250 or another lock system directly to the trailer hitch 100, for instance to a hole made through a part of the trailer hitch 100.

The locking member 260 of the illustrated example further includes a second transversal hole 264. This second hole 264 is configured and disposed to receive an axle 266 that is transversally extending when the device 200 is in the closed position. One end of the axle 266 is welded or other rigidly attached to the interior of a transversal hole 270 provided on the anchoring member 242. The second end of the axle 266 is a free end that can enter inside an opposite transversal hole 272 provided on the anchoring member 240 and in registry with the hole 270. When the device 200 is in the closed position, as shown for instance in FIG. 3, the axle 266 is held in place in-between the two spaced-apart anchoring members 240, 242. Variants are possible as well.

FIG. 10 is a bottom isometric view illustrating the unattached trailer hitch 100 with the device 200 in a closed position and locked thereon.

Figure 11:
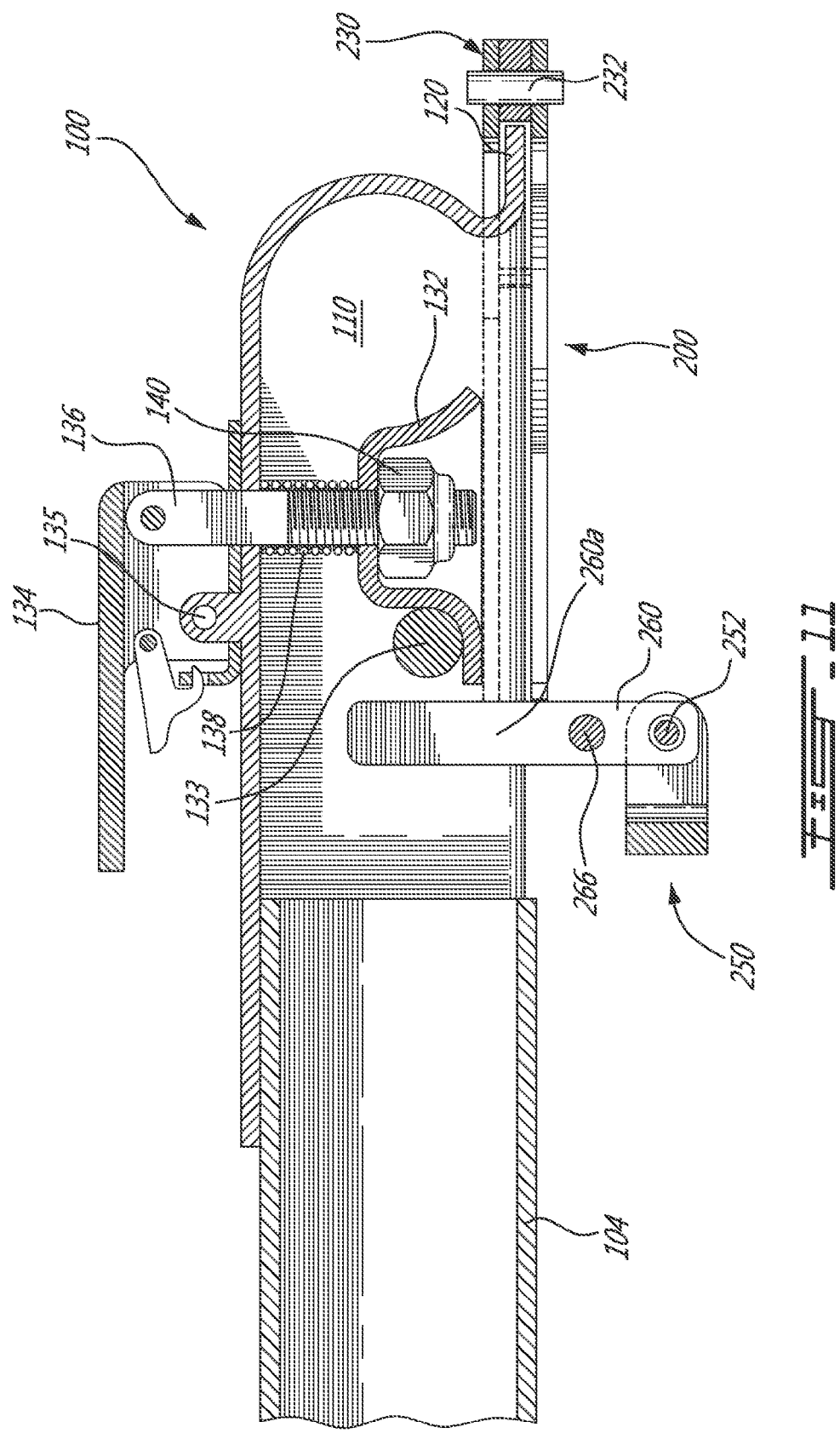
FIG. 11 is a longitudinal cross-sectional view of what is shown in FIG. 10.

FIG. 11 is longitudinal cross-sectional view of what is shown in FIG. 10.

FIG. 12 is a view similar to FIG. 10, showing another example of an anti-theft device 200 as suggested herein. In this example, the trailer hitch 100 and the ball 102 are smaller than in the previous example, for instance the ball 102 being 1⅞ inch (47.6 mm) in FIG. 12 instead of 2 inches (50.8 mm) in the other figures. Other dimensions and configurations are also possible.

In the example of FIG. 12, the nut 140 is flush with the bottom end of the socket 110. The opening 216 formed by the intermediate inner edges 214 includes a rear portion 216a receiving sides of the nut 140 of the ball locking mechanism 130. The rear portion 216a has a semi-hexagonal shape. It is configured and disposed to receive the sides of the nut 140 with a tight fit and prevent it from being rotated. The rear portion 216a can also have other shapes, depending on the implementations. This configuration also prevents access to the nut 140 and the nut 140 cannot be removed when the device 200 is closed.

In use, moving the device 200 from an open position to a closed position on the trailer hitch 100 and then locking the two sides of the device 200 together in the closed position a locking device, for instance a padlock 250, will prevent the device 200 from being removed from the trailer hitch 100. For that point, the device 200 will simultaneously block an unauthorized insertion of a ball 102 into an empty socket 110 and an unauthorized removal of the ball 102 out of the socket 110, if the ball 102 was already present in the socket 110 beforehand, using the pair of plates 202, 204 since they will be located under the trailer hitch 100 when the device 200 is in the closed position. If the ball 102 was already present in the socket 110, towing the trailer using a vehicle to which the ball 102 is connected will not be prevented even if the device 200 remains in the closed position and locked on the trailer hitch 100. If required, the removable locking member 260 can be provided between the plates 202, 204 and inside the trailer hitch 100 for preventing the device 200 from being slid out of the trailer hitch 100 if the socket 110 is empty.

As can be appreciated, the device 200 is very compact, effective, easy to use and can be installed or removed in a few seconds regardless of whether the trailer hitch 100 is attached or unattached to the ball 102. It provides a very convenient way of preventing the theft of a trailer in all situations and the same device 200 can be used with a trailer being towed or a trailer being parked while unattached to a vehicle. It does not interfere with the movements of the ball 102 inside the socket 110 when the trailer is towed.

The present detailed description and the appended figures are meant to be exemplary only. A skilled person will recognize that variants can be made in light of a review of the present disclosure without departing from the proposed concept.

What is claimed is:

1. An anti-theft device for use with a trailer hitch regardless of whether the trailer hitch is attached or unattached to a towing vehicle ball, the ball having a shank portion connected to a towing vehicle and a spherical upper portion located over the shank portion, the spherical upper portion being larger in width than the shank portion, the trailer hitch having a bottom lateral flanged edge, a bottom-opened ball socket and a ball locking mechanism, the device being selectively movable between an open position and a closed position, the device including:

two complementary and substantially coplanar base plates, each base plate including:
a front inner edge, the front inner edges of the two base plates being in engagement with one another when the device is in the closed position and being out of engagement with one another when the device is in the open position;
a rear inner edge, the rear inner edges of the two base plates being in engagement with one another when the device is in the closed position and being out of engagement with one another when the device is in the open position; and
an intermediate inner edge located between the corresponding front and rear inner edges, the intermediate inner edges of the two base plates being spaced apart from one another and forming an intervening opening when the device is in the closed position, the opening being smaller in width than the spherical upper portion of the ball and larger in width than the shank portion of the ball;

two mutually-facing rim members, one for each base plate, each rim member being rigidly connected to and projecting above an outer side edge of the corresponding base plate, the rim members defining an inner slotted space receiving corresponding right and left portions of the lateral flanged edge when the device is in the closed position on the trailer hitch, the rim members having mating front ends that are pivotally connected together by a front hinge; and two anchoring members, one for each base plate, each anchoring member being rigidly connected to and downwardly projecting at a rear end of the corresponding base plate.

2. The anti-theft device as defined in claim 1, wherein the anchoring members are facing to one another when the device is in the closed position.

3. The anti-theft device as defined in claim 1, wherein each anchoring member includes a transversal hole, both transversal holes being in registry with one another when the device is in the closed position.

4. The anti-theft device as defined in claim 3, further including a padlock cooperating with the transversal holes of the anchoring members to hold the device in the closed position.

5. The anti-theft device as defined in claim 1, further including a locking member having an extended portion projecting above the base plates when the device is in the closed position.

6. The anti-theft device as defined in claim 5, wherein the locking member is removable from the device when the device is in the open position.

7. The anti-theft device as defined in claim 6, wherein the locking member has a bottom portion positioned in-between the anchoring members when the device is in the closed position.

8. The anti-theft device as defined in claim 5, wherein the anchoring members have inner faces that are spaced apart from one another when the device is in the closed position, the device including a transversal pivot axle projecting inwardly from one of the anchoring members, the locking member being pivotally mounted on the axle.

9. The anti-theft device as defined in claim 1, wherein the front ends of the rim members are curved and include overlapping flat portions that are part of the hinge.

10. The anti-theft device as defined in claim 9, wherein the hinge includes an axle to which the overlapping flat portions are connected, the axle being preferably substantially vertically oriented.

11. The anti-theft device as defined in claim 1, wherein each rim member receives the corresponding portion of the lateral flanged edge of the trailer hitch in an uninterrupted manner.

12. The anti-theft device as defined in claim 1, wherein the device includes a right side and a left side, each side being a monolithic piece formed by corresponding ones of the base plates, the rim members and the anchoring members.

13. The anti-theft device as defined in claim 12, wherein the device is substantially symmetrical with reference to a medial axis.

14. The anti-theft device as defined in claim 1, wherein the device is made of metal.

15. The anti-theft device as defined in claim 1, wherein in use, the rear inner edges of the base plates are positioned under a region of the trailer hitch that is immediately behind the socket and above which is located a locking element of the ball locking mechanism.

16. The anti-theft device as defined in claim 1, wherein the opening formed by the intermediate inner edges includes a rear portion receiving sides of a downwardly-facing nut of the ball locking mechanism.

17. The anti-theft device as defined in claim 16, wherein the rear portion of the opening has a semi-hexagonal shape.

18. An anti-theft method for a trailer having a trailer hitch, the method including:
(A) moving a two-sided anti-theft device from an open position to a closed position on the trailer hitch, the device including two mutually-facing rim members defining an inner slotted space receiving corresponding portions of a lateral flanged edge of the trailer hitch, the rim members having mating front ends that are pivotally connected together at a front hinge;
(B) locking the two sides of the device together in the closed position on the trailer hitch using a locking device to prevent the device from being removed from the trailer hitch;
(C) simultaneously blocking an unauthorized insertion of a ball into an empty bottom-opened ball socket of the trailer hitch and blocking an unauthorized removal of the ball out of the socket, if the ball was already present in the socket before step (A), using a pair of juxtaposed plates provided on the device and located under the trailer hitch when the device is in the closed position, the plates defining an opening and each of the rim members being rigidly connected to a corresponding one of the plates; and
(D) if the ball was already present in the socket before step (A), towing the trailer using a vehicle to which the ball is connected, the trailer being towed with the device still being in the closed position and locked on the trailer hitch.

19. The method as defined in claim 18, wherein the step of locking includes providing a removable locking member on the device, the locking member extending upwardly between the plates and inside the trailer hitch for preventing the device from being slid out of the trailer hitch if the socket is empty.

20. The method as defined in claim 18, wherein the trailer hitch is constructed as defined in claim 1.

* * * * *